April 4, 1961  R. E. CARLBERG  2,977,857
CARRIAGE FOR A MOBILE MISSILE MOUNT
Filed April 22, 1954  3 Sheets—Sheet 3
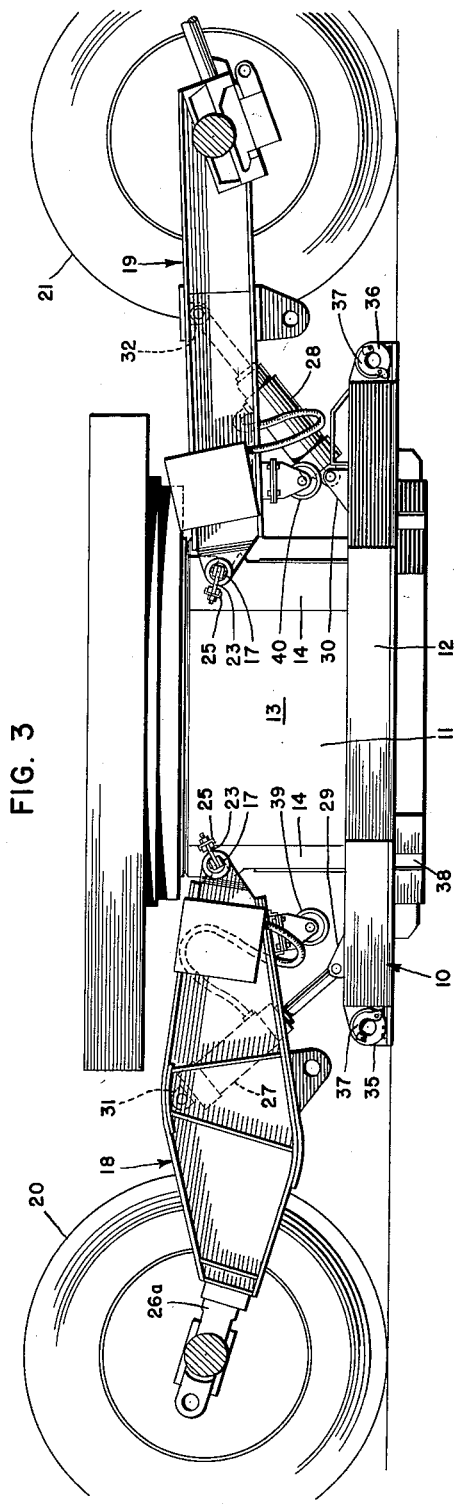
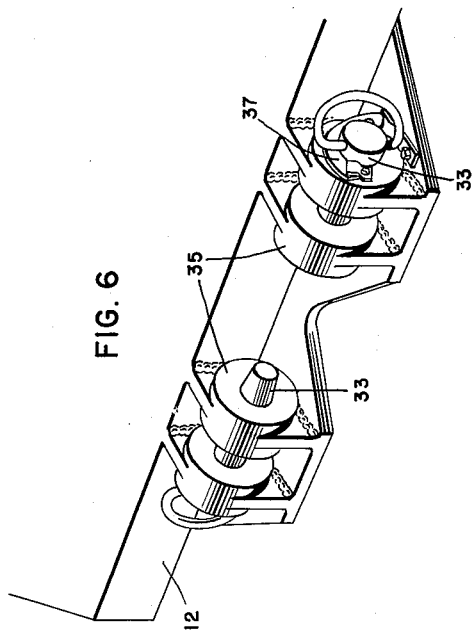
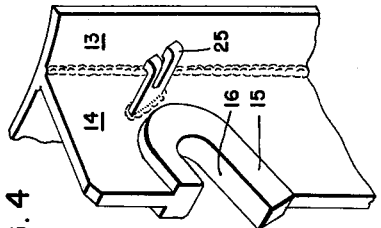
INVENTOR
ROBERT E. CARLBERG
BY
ATTORNEYS

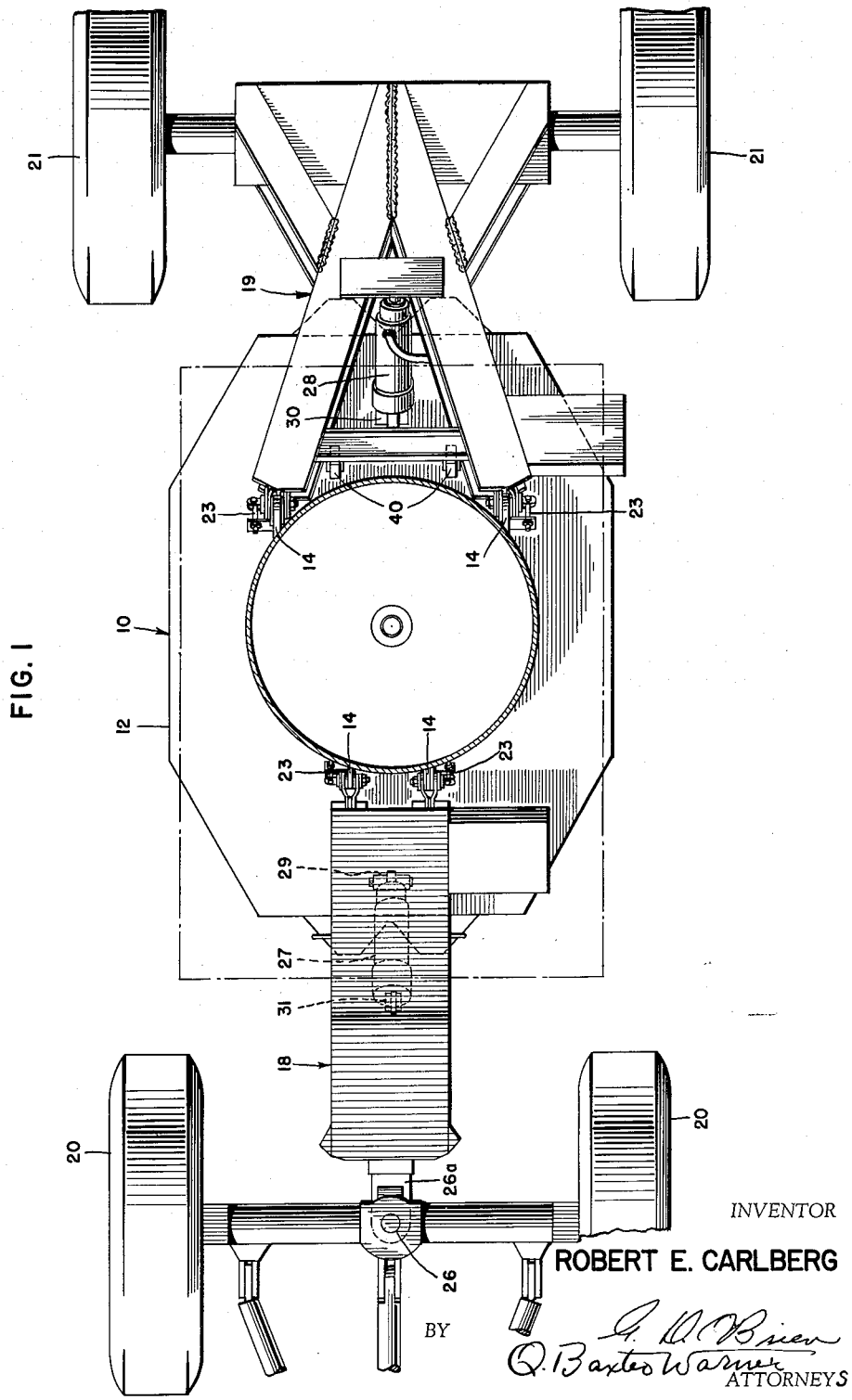

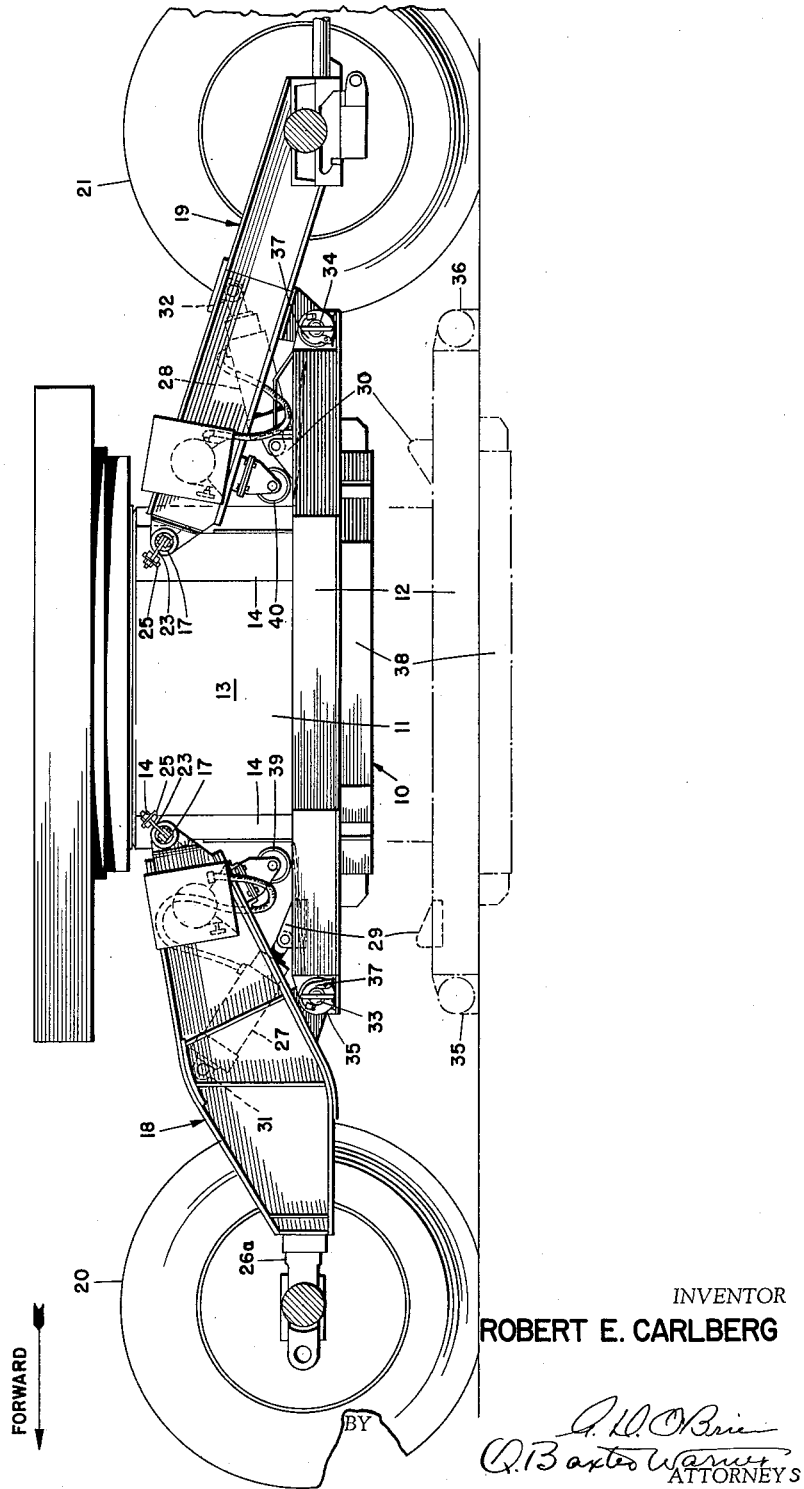

United States Patent Office 2,977,857
Patented Apr. 4, 1961

2,977,857
CARRIAGE FOR A MOBILE MISSILE MOUNT

Robert E. Carlberg, Falls Church, Va., assignor to the United States of America as represented by the Secretary of the Navy Filed Apr. 22, 1954, Ser. No. 425,056

4 Claims. (Cl. 89—40)

(Granted under Title 35, U.S. Code (1952), sec. 266)

The invention described herein may be manufactured and used by or for the Government of the United States of America for governmental purposes without the payment of any royalties thereon or therefor.

The invention relates to improvements in mobile mounts particularly well adapted but not necessarily restricted to use in emplacement type missile launchers. More specifically, the invention relates to an improved carriage structure for mobile mounts of the character indicated.

An important object of the invention is to provide a mobile mount for an emplacement type launcher with improved raising and lowering mechanism.

Another object of the invention is the provision of a mobile mount with leading and following bogie frames that are readily releasably attachable without requiring extra tools and equipment.

A further object is to provide a mobile mount having hydraulic mechanism for raising the mount to a traveling position and means for relieving the hydraulic mechanism of the load in the raised position.

Other objects and many of the attendant advantages of this invention will be readily appreciated as the same becomes better understood by reference to the following detailed description when considered in connection with the accompanying drawings wherein:

Fig. 1 is a top plan view of the mobile mount with the upper portion thereof cut away and shown in horizontal section;

Figs. 2 and 3 are side elevational views of the mobile mount with portions cut away and shown in vertical section, and showing the mount in traveling and emplaced positions respectively.

Fig. 4 is a perspective view of a bogie connecting slotted member preferably forming part of the invention;

Fig. 5 is a perspective view of the connecting member shown in Fig. 4 with a bogie connector attached thereto; and Fig. 6 is a perspective view of bogie gudgeons, bogie pintles and connector locks preferably forming part of the invention.

In the drawings, which for the purpose of illustration show only a preferred embodiment of the invention, and wherein similar reference characters denote corresponding parts throughout the several views, the numeral 10 generally designates the mobile mount comprising a central carriage structure 11 including a platform base 12 surmounted by an upstanding hollow cylindrical pedestal 13 on which the entire launcher structure (not shown) is mounted. Alternatively, some other load may be imposed on the pedestal.

Formed integrally with the pedestal 13, as shown more particularly in Figs. 4 and 5, are external vertical ribs 14 each provided with a substantially U-shaped reinforcement 15 defining an inwardly extending, upwardly inclined slot 16. Pivotally engaging the pedestal ribs 14, as by pivot pins 17 disposed transversely of the slots 16, are lead and follower cantilever frames or bogie frames 18, 19 supported at their forward and after ends by front and rear wheel assemblies 20, 21 respectively. As shown in Fig. 5, the pins 17 each include a clevis 22 pivotally supporting a swing rod 23 and nut 24 cooperable with a bifurcated bracket 25, the arrangement providing means for releasably holding the pins 17 in engagement with the reinforced slot walls 15. The front wheel assembly 20 is pivoted at 26 on a longitudinal swivel shaft 26a for steering and for lateral tilting on uneven ground inasmuch as the rear bogie frame and wheel assembly 21 are rigid.

In order to vertically move the pedestal between the elevated traveling position of Fig. 2 and the emplaced position in firm engagement with the ground as shown in Fig. 3, a fluid actuated device is utilized such as front and rear hydraulic cylinders 27, 28. These cylinders are pin-connected between brackets 29, 30 on the forward and after portions of the pedestal base 12 and brackets 31, 32 that are mounted on the lead and follower bogie frames outwardly beyond the brackets 29, 30, so that the cylinders are oppositely inclined upwardly and outwardly from the base 12.

When the mount 10 is elevated to its travel position, the pedestal base 12 may be connected as by pintles 33, 34 to the lead and follower bogie frames 18, 19 in order to relieve the hydraulic cylinders 27, 28 of the load so that there will be no tendency of the hydraulic fluid to seep past the pistons and allow the pedestal to lower during transit. As shown in Fig. 6, the cylinder load relieving pintles or locking pins 33, 34 may be releasably held in the base frame gudgeons 35, 36 by any suitable type latch 37.

When the mount is to be lowered from the travel position shown in Fig. 2, and the pedestal emplaced on the ground, the pintles 33, 34 are removed and the hydraulic fluid in the cylinders 27, 28 slowly released, either individually or simultaneously, allowing the pedestal to settle to the ground. Subjacent the base 12 is a spade 38 shaped like a cookie cutter which penetrates the ground with an anchoring action. Thereupon the pins at the brackets 29, 30 connecting the cylinders to the pedestal base 12 are removed and the swing rods 23 freed from the brackets 25. Inasmuch as the bogie connector pins 17 ride in slots 16, the lead and follower frames 18, 19 may then be detached without having to pull the pins 17 from the frames. Wheels 39, 40 at the inner ends of the frames facilitate removal of the frames 18, 19 after disconnection from the pedestal.

Obviously many modifications and variations of the present invention are possible in the light of the above teachings. It is therefore to be understood that within the scope of the appended claims the invention may be practiced otherwise than as specifically described.

What is claimed is:

1. A carriage for a mobile missile mount or the like comprising a platform, a pedestal mounted on the platform and provided with forward and after portions defining inwardly and upwardly inclined slots, a lead bogie frame and a follower bogie frame each having an outer wheel-supported end portion and an inner pivotal end portion, said pedestal slots receiving the pivotal end portions of said bogie frames, means releasably securing said pivotal end portions against removal from said pedestal slots, and hydraulic means releasably connected between said platform and said bogie frames for vertically moving the platform between a lowered ground-engaging position and an elevated position clear of the ground for travel.

2. A carriage for a mobile missile mount or the like comprising a platform having a forward and an after end portion, a pedestal mounted on the platform, lead and follower cantilever frames having inner end portions pivoted to said pedestal and wheel supported outer end portions extending beyond opposite ends of said platform, upwardly and outwardly inclined hydraulic cylinders at said forward and after end portions of the platform, said cylinders being releasably connected between said platform and said cantilever frames intermediate their ends for lifting the platform from a ground engaging position to an elevated position clearing the ground for travel.

3. An undercarriage comprising a platform and an upstanding pedestal thereon by which a launcher structure or equivalent load is carried, front and rear wheeled frames for the pedestal, hydraulic cylinders to sequentially raise the pedestal for transportation and lower it to the ground, said cylinders being pivotally and removably connected to the platform, and pivot and locking pin sets connecting each of the frames to the pedestal and platform respectively at two separated points, the locking pins locking the frames to the pedestal during transit to relieve the hydraulic cylinders of the load, both the locking pins and the pivot pins also being removable after lowering the pedestal to the ground to enable separation of the wheeled frames from the pedestal.

4. A carriage for a mobile missile mount comprising a platform, a pedestal mounted on said platform, forward and after cantilever frames, said cantilever frames each being bifurcated and provided with registering pin receiving apertures at the inner ends thereof, a pivot pin secured in said pin receiving apertures, portions of said pedestal defining an open-ended slot for each of said cantilever frames and having the open end thereof positioned for receiving said pivot pin individual thereto, said pivot pin extending transversely through the pedestal slot individual thereto, a clevis secured to each pin, a bifurcated bracket for each cantilever frame and rigidly secured to said pedestal, a swing rod pivotally connected to each clevis and extendable through the bifurcated portion of said bracket, means for releasably connecting said swing rod to its respective bracket, a plurality of wheels connected to the outer ends of said cantilever frames for supporting the latter for cross-country travel, a wheel for each cantilever frame and connected to the inner end portion thereof for facilitating removal of the cantilever frames from the pedestal when the swing bars are disconnected from their respective bifurcated brackets, fluid actuating means releasably connected between said platform and said cantilever frames for vertically moving the platform between a lowered position in firm emplacement with the ground and an elevated position clearing the ground for travel, said platform having forward and after portions defining pintle receiving apertures, and said forward and after cantilever frames having intermediate portions defining pintle receiving apertures, said platform pintle receiving apertures aligning with said cantilever frame pintle receiving apertures upon elevation of said platform to a ground clearing position for travel, and pintles extending through said aligning pintle receiving apertures for releasably holding the platform in the elevated position to relieve the fluid actuated means during travel.

References Cited in the file of this patent
UNITED STATES PATENTS

| | | |
|---|---|---|
| 1,951,338 | Barnes | Mar. 20, 1934 |
| 2,199,392 | Dabrasky | May 7, 1940 |
| 2,313,877 | Joyce | Mar. 16, 1943 |
| 2,348,445 | Bayer | May 9, 1945 |
| 2,382,836 | Walter | Aug. 14, 1945 |
| 2,549,835 | McCann et al. | Apr. 24, 1951 |

FOREIGN PATENTS

| | | |
|---|---|---|
| 914,867 | France | July 1, 1946 |